US007557800B2

United States Patent
Yanagisawa

(10) Patent No.: US 7,557,800 B2
(45) Date of Patent: Jul. 7, 2009

(54) DISPLAY APPARATUS, AND METHOD FOR CONTROLLING THE SAME

(75) Inventor: Tetsuya Yanagisawa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 654 days.

(21) Appl. No.: 11/231,319

(22) Filed: Sep. 20, 2005

(65) Prior Publication Data

US 2006/0066507 A1 Mar. 30, 2006

(30) Foreign Application Priority Data

Sep. 27, 2004 (JP) ............................. 2004-279202

(51) Int. Cl.
*G06F 3/041* (2006.01)
(52) U.S. Cl. ............................. 345/173; 345/4; 345/7
(58) Field of Classification Search ................. 345/173, 345/4, 7, 174
See application file for complete search history.

(56) References Cited

U.S. PATENT DOCUMENTS

2003/0006892 A1* 1/2003 Church ..................... 340/439
2003/0007227 A1* 1/2003 Ogino ....................... 359/227
2004/0119896 A1* 6/2004 Kean et al. .................. 349/25
2005/0111100 A1* 5/2005 Mather et al. .............. 359/464
2006/0191177 A1* 8/2006 Engel ........................ 40/453

* cited by examiner

*Primary Examiner*—Amare Mengistu
*Assistant Examiner*—Hong Zhou
(74) *Attorney, Agent, or Firm*—Brinks Hofer Gilson & Lione

(57) ABSTRACT

A dual-view display apparatus is provided which, when one operator manipulates an operation screen for the operator's corresponding content, can prevent a displayed image of another operator's content from being obscured by the one operator, and which has a simple construction to allow reduction in cost, size, and weight. The display apparatus includes a display controller for performing control for local display of the image of one content corresponding to an arbitrary viewing position at a noninterference area when the operator touches a display screen, the noninterference area having no influence on display of the image of another content corresponding to another viewing position even by operation of the operation screen for the one content on the corresponding viewing screen viewed from the one viewing position.

13 Claims, 3 Drawing Sheets

FIG. 3
PASSENGER-SIDE VIEWING SCREEN
DRIVER-SIDE VIEWING SCREEN
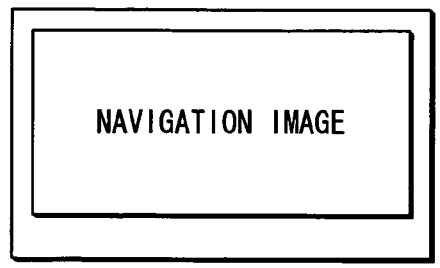
FIG. 4
PASSENGER-SIDE VIEWING SCREEN
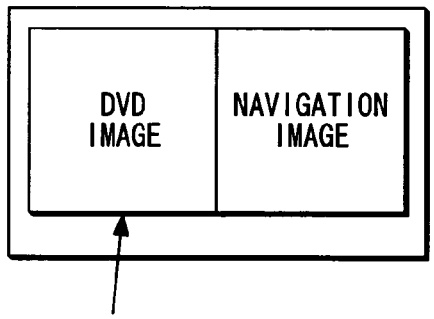
PASSENGER-SIDE CONTENT
DRIVER-SIDE VIEWING SCREEN
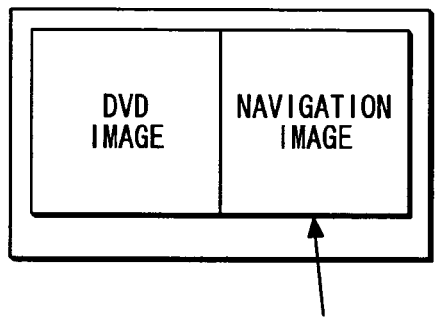
DRIVER-SIDE CONTENT
FIG. 5
PASSENGER-SIDE VIEWING SCREEN
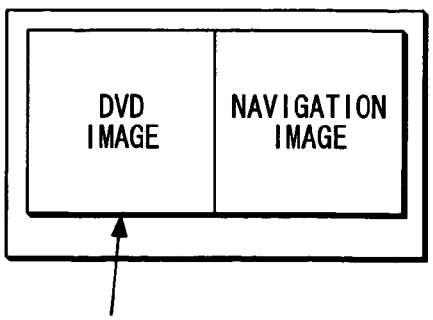
PASSENGER-SIDE CONTENT
DRIVER-SIDE VIEWING SCREEN
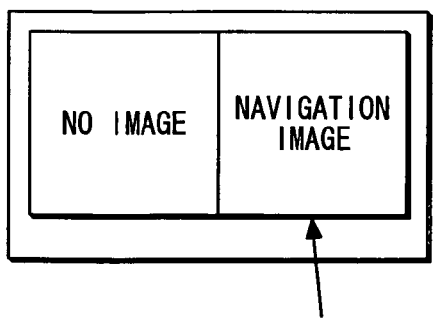
DRIVER-SIDE CONTENT

DISPLAY APPARATUS, AND METHOD FOR CONTROLLING THE SAME

BACKGROUND

1. Technical Field of the Invention

The present invention relates to display apparatuses, and more particularly, to display apparatuses suitable for use in displaying images of a plurality of different contents on a display screen.

2. Description of the Related Art

In recent years, a dual-view display has been proposed for use in a navigation apparatus or the like for displaying images or pictures of two different contents, such as navigation, DVD, or TV, on a single display screen at the same time. In a navigation apparatus with such a dual-view display mounted thereon, operators positioned on a driver side and a passenger side of the vehicle can view respective images of different contents on their viewing screens simply by looking at the display screen, as disclosed in, for example, JP-A-6-186526, JP-A-7-103778, and JP-A-2004-206089.

On the display screen of the known dual-view display, an operation screen consisting of a touch panel is provided for performing operations, including selection of a menu item for the navigation or DVD. Such an operation screen is touched by the operator positioned on the driver side or the passenger side to perform an operation. As a result, when one operator touches the operation screen with his/her hand, the image displayed on the other operator's viewing screen may be partially obscured by the hand of the former.

Conventionally, in cases where there are displayed the respective operation screens for both the DVD and the navigation, a complicated detector is disadvantageously required to determine whether the DVD and/or the navigation system is operated.

SUMMARY OF THE INVENTION

The present invention has been accomplished so as to solve these problems encountered with the prior art, and it is an object of the invention to provide a display apparatus which, when one operator manipulates an operation screen for the operator's corresponding content, can prevent a displayed image of the other operator's content from being obscured by the first operator, and which has a simple construction to allow reduction in cost, size, and weight.

To achieve the above-mentioned object, according to one aspect of the invention, there is provided a display apparatus that is capable of displaying a composite image of a plurality of contents on a display screen such that, when the display screen of a display unit is viewed from different viewing positions with different viewing angles with respect to a direction normal to the display screen, an image of each of the different contents corresponding to the respective viewing positions can be viewed on a viewing screen from the corresponding viewing position, the display apparatus being capable of displaying an operation screen consisting of a touch panel on the viewing screen with at least one of the plurality of contents being displayed as the image of the content. The display apparatus comprises a display controller for performing control for local display of the image of the one content corresponding to the one arbitrary viewing position at a noninterference area when an operator touches the display screen, the noninterference area having no influence on display of the image of another content corresponding to another viewing position even by the operation of the operation screen for the one content located on the corresponding viewing screen viewed from the one viewing position.

With this arrangement, the content corresponding to the one viewing position can be locally displayed at the noninterference area on the viewing screen viewed from this one viewing position, so that operating the operation screen displayed at the noninterference area has no influence on the display of the image of another content corresponding to another viewing position.

Thus, the areas each of which has an operation screen for corresponding content displayed thereon do not interfere with each other. The operation of the operation screen for content corresponding to a viewing position can be simply detected based only on data about coordinates on the touch panel.

In the display apparatus according to one aspect of the invention, the display controller may be capable of performing control for local display of the image of another content at an area other than the noninterference area on the viewing screen as viewed from the one viewing position.

With this arrangement, the content corresponding to one viewing position and the content corresponding to another viewing position may be simultaneously displayed on the viewing screen as viewed from the one viewing position, whereby the operator positioned in the one viewing position can avoid touching the displayed image of the other content.

Thus, another operator positioned in another viewing position and who views the displayed image of the corresponding content on the viewing screen can effectively avoid having the viewing of the displayed image being interfered with by the operation performed by the one operator.

In the display apparatus according to one aspect of the invention, when the one viewing position is a driver-side viewing position and the corresponding content is concerned with navigation, the display controller may control the display of the image in such a manner that the other content is not displayed. With this arrangement, the operator on a driver side of the vehicle, who is driving and performing navigation, cannot view the image of content other than the navigation content.

Further, in the display apparatus according to one aspect of the invention, the display controller may finish the control for the local display of the content when the operation of the operation screen is completed. This arrangement permits switching to full-screen display when the operation of the operation screen performed by the operator is completed.

In the display apparatus according to one aspect of the invention, the display controller may control the display of the image in such a manner that the image of the driver-side content is displayed at an area within a predetermined range on a non-passenger side of the viewing screen as viewed from the driver side, the area serving as the noninterference area on the viewing screen as viewed from the driver side, and that the image of the passenger-side content is displayed at another area within a predetermined range on a non-driver side of the viewing screen as viewed from a passenger side, this area serving as another noninterference area on the viewing screen as viewed from the passenger side. With this arrangement, the images of the contents can be locally displayed or unevenly distributed in respective positions which makes it easy for the operators on the driver side and passenger side to view and perform the operation.

According to the display apparatus of the invention, even when one operator manipulates the operation screen for the operator's own content, the displayed image of another operator's content is not obscured by the one operator, thereby enhancing visibility. Further, the display apparatus of the invention has a simple construction to allow reduction in cost, size, and weight.

The display apparatus of the invention can more effectively prevent the displayed image of another operator's content from being obscured by the operation of the operation screen performed by the one operator.

Further, according to the display apparatus of the invention, the operator positioned on the driver side who performs the navigation operation and drives the vehicle can be prevented from being distracted by an image other than the navigation image, which leads to improved safety in driving.

Moreover, the display apparatus of the invention can enhance visibility both in cases where the operation screen is displayed and in cases where the operation screen is not displayed.

In addition, the display apparatus of the invention can improve the visibility of the viewing screens from the driver side and from the passenger side, while improving the operability of the operation screen for the content displayed on each of the viewing screens.

BRIEF DESCRIPTION OF THE DRAWINGS

FIG. 3 is a diagram showing a full-screen display state of a driver-side viewing screen and a passenger-side viewing screen in a non-operational mode in the display apparatus of the embodiment;

FIG. 4 is a diagram showing an example of a state in which contents are locally displayed at respective non-interference areas on the driver-side viewing screen and on the passenger-side viewing screen in an operational mode in the display apparatus of the embodiment; and FIG. 5 is a diagram showing another example that is different from that shown in FIG. 4, and of a state in which contents are locally displayed at respective non-interference areas on the driver-side viewing screen and on the passenger-side viewing screen in an operational mode in the display apparatus of the embodiment.

DETAILED DESCRIPTION OF THE DRAWINGS AND THE PRESENTLY PREFERRED EMBODIMENTS

A display apparatus according to certain embodiments of the invention will now be described with reference to FIGS. 1 to 5. The display apparatus of the embodiment can be used as a display apparatus in a vehicle navigation apparatus.

Figure 1:
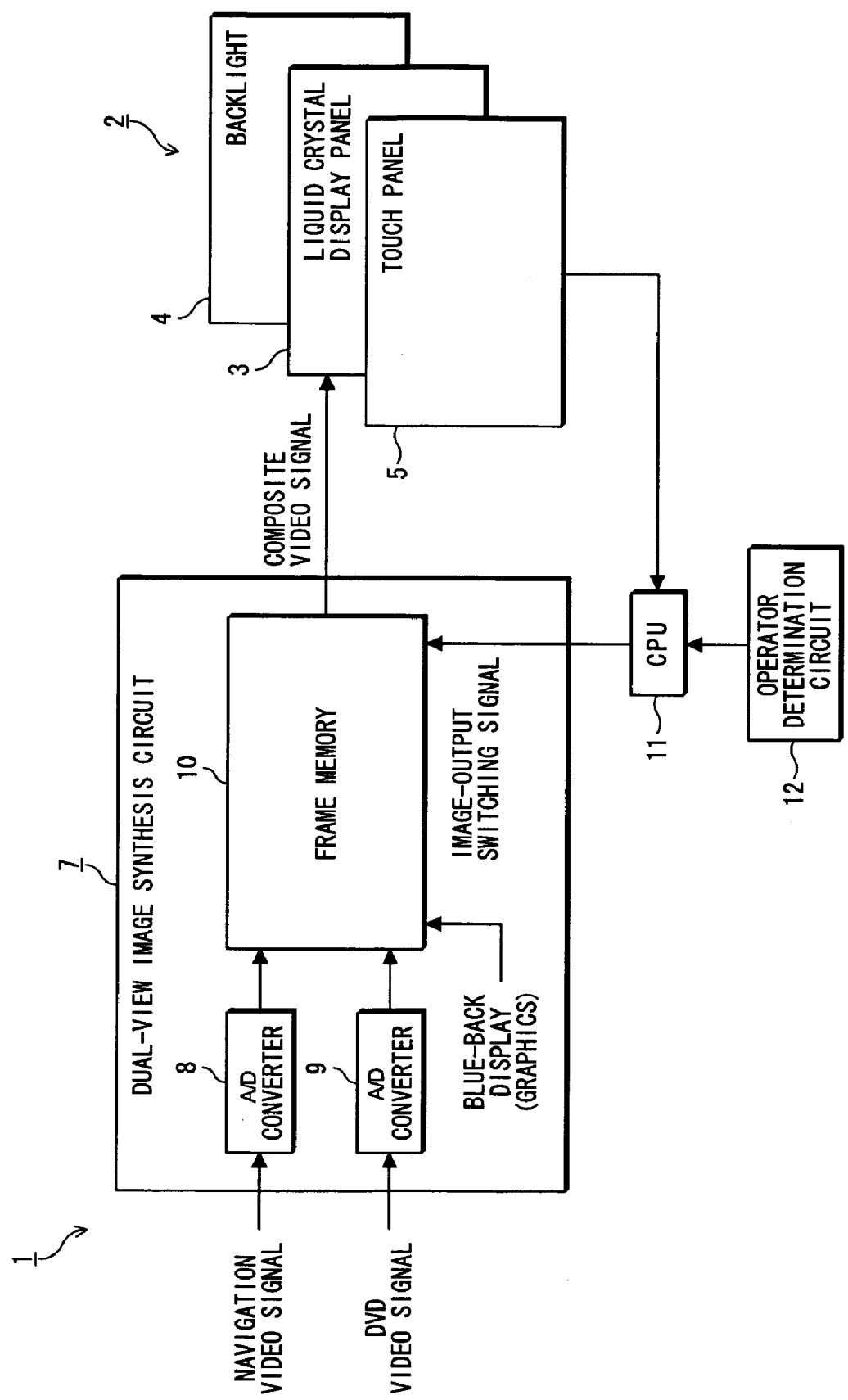
FIG. 1 is a block diagram showing a display apparatus according to one embodiment of the invention.

As shown in FIG. 1, a display apparatus 1 of the embodiment includes a display unit 2 which is composed of a liquid crystal display panel 3, a backlight 4 disposed on the back side of the liquid crystal display panel 3, and a touch panel 5 disposed on the front side of the liquid crystal panel 3.

The display device 1 of the embodiment is a dual-view display, in which, when a display screen serving as a front side of the touch panel 5 is viewed from two viewing positions with different viewing angles from each other with respect to a direction normal to the display screen, an image of each of the different contents corresponding to the respective viewing positions can be viewed on a viewing screen when viewed from the corresponding viewing position.

It should be noted that when the display apparatus 1 is mounted on the vehicle, one of the two viewing positions is a driver-side viewing position, while the other is a passenger-side viewing position. In the present embodiment, for convenience, the content corresponding to the driver-side viewing position is related to navigation, while the content corresponding to the passenger-side viewing position is a DVD. For both contents of the navigation and the DVD, operation screens therefor consisting of the touch panel are displayed on a viewing screen viewed from the driver side (hereinafter referred to as a driver-side viewing screen), and on a viewing screen viewed from the passenger side (hereinafter referred to as a passenger-side viewing screen), respectively.

The display apparatus 1 of the embodiment includes a dual-view image synthesis circuit 7. The circuit 7 receives as inputs a video signal for the navigation serving as the driver-side content and a video signal for the DVD serving as the passenger-side content. The dual-view image synthesis circuit 7 is provided with two A/D converters 8 and 9 corresponding to the video signals for the navigation and DVD, respectively. The A/D converters 8 and 9 convert a received analog video signal into a digital video signal to be supplied to the circuit. Each of the A/D converters 8 and 9 has its output port connected to a frame memory 10, which forms a part of the display controller.

Figure 2:
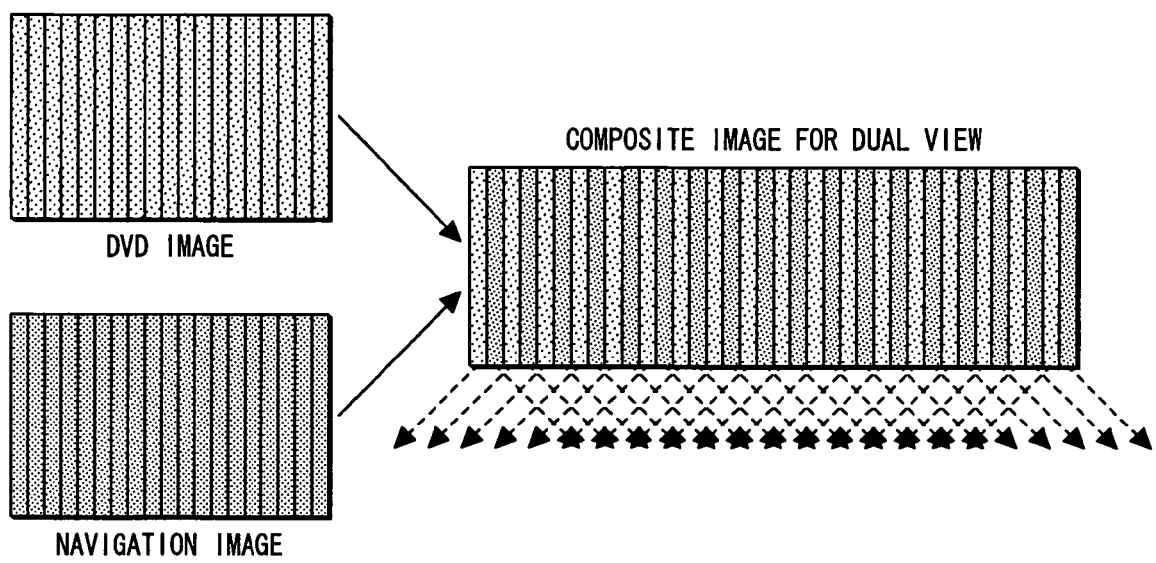
FIG. 2 is a diagram explaining a method of generating data on a composite image in the display apparatus of the embodiment.

The frame memory 10 processes image data in the video signals for the navigation and the DVD to generate composite image data for the dual-view display. The composite image data is to display a composite image in which the navigation image and the DVD image alternate lines as shown in FIG. 2. Then, the frame memory 10 provides the generated composite image data to the liquid crystal display panel 3 in the form of the composite video signal.

Thus, the composite image of the navigation and DVD is displayed on the display screen of the display unit 2. When the composite image is viewed from the driver side, the navigation image can be viewed on the driver-side viewing screen. In contrast, when the composite image is viewed from the passenger side, the DVD image can be viewed on the passenger-side viewing screen (see FIG. 3). Note that a signal for a blue-back (background) display is also provided to the frame memory 10 to be used in generation of the composite image.

Further, in the embodiment, the dual-view image synthesis circuit 7 has an input connected to a CPU 11 constituting a part of the display controller, and the CPU 11 has an input connected to the touch panel 5.

When the touch panel 5 is operated by an operator positioned on the driver side or passenger side, a detection signal of the touch panel 5 is supplied to the CPU 11. The detection signal determines that the navigation or DVD is put into the operational mode of the operation screen. The CPU 11 sends to the frame memory 10 an operation-time image-output switching signal for switching the display of the composite image from full-screen display (see FIG. 3) to local display (see FIG. 4) in accordance with the detection of the operational mode.

After receiving the operation-time image-output switching signal from the CPU 11, the frame memory 10 generates the composite image data for the local display, which involves locally displaying the navigation image at a noninterference area on the driver-side viewing screen, which area has no influence on the display of the DVD image located on the passenger-side viewing screen, and locally displaying the DVD image at another noninterference area on the passenger-side viewing screen, which area has no influence on the display of the navigation image located on the driver-side viewing screen. The composite image data for the local display can be generated by appropriately processing the navigation image data and the DVD image data shown in FIG. 2.

The frame memory 10 provides the generated composite image data for the local display to the liquid crystal display panel 3 in the form of the composite video signal for the local display.

This can prevent the DVD image displayed at the noninterference area on the passenger-side viewing screen from being obscured by the driver-side operator even if the driver-side operator operates the operation screen for the navigation displayed at the noninterference area of the driver-side viewing screen. Conversely, the navigation image displayed at the noninterference area of the driver-side viewing screen can be prevented from being obscured by the passenger-side operator even if the passenger-side operator operates the operation screen for the DVD displayed at the noninterference area of the passenger-side viewing screen.

In the embodiment, the composite image data for the local display involves displaying the navigation image at a partial area located on the non-passenger side of the driver-side viewing screen, which area serves as the noninterference area on the driver-side viewing screen, as shown in the right-side drawing of FIG. 4, while displaying the DVD image at another partial area on the passenger side (on a left side in FIG. 4) of the driver-side viewing screen. Thus, since the driver-side operator can avoid touching the area of the DVD image displayed on the driver-side viewing screen, the passenger-side operator viewing the DVD image displayed on the passenger-side viewing screen can avoid the viewing of the DVD image from being obstructed by the driver-side operator. Further, the navigation image can be locally displayed in the position which makes it easy for the driver-side operator to view and perform the operation on the driver-side viewing screen.

In addition, as shown in the left-side drawing of FIG. 4, the composite image data for the local display involves displaying the DVD image at a partial area on the non-driver side (on the left side in FIG. 4) of the passenger-side viewing screen, which area serves as the noninterference area on the passenger-side viewing screen, while displaying the navigation image at a partial area of the driver side (on the right side in FIG. 4) of the passenger-side viewing screen. Thus, since the passenger-side operator can avoid touching the area of the navigation image displayed on the passenger-side viewing screen, the driver-side operator viewing the navigation image displayed on the driver-side viewing screen can avoid the viewing of the navigation image from being obstructed by the passenger-side operator. Further, the DVD image can be locally displayed in the position which makes it easy for the passenger-side operator to view and perform the operation on the passenger-side viewing screen.

It should be noted that instead of the construction shown in the right-side drawing of FIG. 4, alternatively no DVD image may be locally displayed on the driver-side viewing screen as shown in FIG. 5. In this case, the driver-side operator is not distracted by the DVD image, which leads to improved safety in driving.

In addition to the above construction, in the present embodiment, the CPU 11 has an input connected to an operator determination circuit 12, into which the detection signal of the touch panel 5 is entered. The operator determination circuit 12 can determine whether an operation of the touch panel 5 is to operate the operation screen for the navigation or for the DVD, based simply on data about coordinates obtained from the detection signal of the touch panel 5. Based on the determination results of the operator determination circuit 12, the CPU 11 supplies a command signal for shifting the image of the navigation or DVD, whose operation screen is operated, according to the operation, to a generating circuit (not shown) for generating image data for the DVD or navigation.

In the embodiment, when the operational mode of the DVD or navigation is completed, the CPU 11 supplies to the frame memory 10 a non-operation-time image-output switching signal for finishing the control of the local display and for switching from the local display to the full-screen display. Thus, after the operational mode is completed, the images of the navigation and DVD can be displayed in the full screen mode on the driver-side viewing screen and on the passenger-side viewing screen, respectively, thereby improving visibility after the completion of the operational mode.

In order to determine whether the operational mode is completed, for example, it may be determined whether a next operation is operated within a predetermined time interval after the previous operation of the operation screen, using a timer or the like. If a next operation is not performed within the predetermined time interval, the determination may be made that the operational mode is completed.

Now, the operation of the present embodiment will be described in detail.

In the embodiment, as shown in FIG. 3, when at least one of the driver-side and passenger-side operators touches the touch panel 5 with the images of the navigation and DVD being displayed on the driver-side and passenger-side viewing screens in full-screen mode, respectively, the detection signal is supplied to the CPU 11. This permits the CPU 11 to detect at least one of the navigation and DVD being in the operational mode. When the CPU 11 detects the operational mode, it supplies the operation-time image-output switching signal to the frame memory 10 of the dual-view image synthesis circuit 7.

After receiving the operation-time image-output switching signal, the frame memory 10 generates the composite image data for the local display. The composite image data involves displaying the navigation image at the non-passenger-side area on the driver-side viewing screen, and the DVD image at the passenger-side area thereon. Also, the composite image data involves displaying the DVD image at the non-driver-side area on the passenger-side viewing screen, and the navigation image at the driver-side area thereon. The frame memory 10 supplies the composite image data for the local display to the display unit 2.

Thus, on the display screen of the display unit 2, the image of the navigation and the image of the DVD are separately displayed on the driver-side viewing screen and on the passenger-side viewing screen, respectively, as shown in FIG. 4.

At this time, the images of the navigation and DVD serving as the contents are displayed in such positions that the image of one of the contents does not interfere with the image of the other by the operation of one content. Therefore, even if the driver-side operator manipulates the operation screen for navigation on the driver-side viewing screen, the DVD image on the passenger-side viewing screen is not obscured by the hand of the driver-side operator. Conversely, even if the passenger-side operator manipulates the operation screen for the DVD on the passenger-side viewing screen, the navigation image on the driver-side viewing screen is not obscured by the hand of the passenger-side operator.

When the operation of the operation screen is not performed within a fixed time period, the CPU 11 determines that the operational mode is completed and supplies to the frame memory 10 the non-operation-time image-output switching signal for switching from the local display to the full-screen display. This displays the images of the navigation and DVD again on the driver-side and passenger-side viewing screens in the full-screen mode, respectively, as shown in FIG. 3.

As can be seen from the above description, according to this embodiment, the navigation image is locally displayed at the noninterference area on the driver-side viewing screen, while the DVD image is locally displayed at the other noninterference area on the passenger-side viewing screen. Even an operation of the operation screen for one content displayed at the corresponding noninterference area cannot obstruct the display of the image of the other content. As a result, even when one of the driver-side and passenger-side operators operates the operation screen for the operator's corresponding content, the display of the image of the other operator's content is not obscured by the one operator, thereby enhancing the visibility of the other operator's content.

Thus, the areas displaying the operation screens for the navigation and DVD do not interfere with each other, thereby allowing a simple determination of which content's operation screen is operated based only on data about the coordinates on the touch panel. As a result, the mechanism for detecting the operator can have a simple configuration, thereby achieving reduction in cost, size and weight.

Note that the invention is not limited to the embodiments described above, and various modifications and variants can be devised by those skilled in the art which fall within the scope and spirit of the invention. For example, the invention can be effectively applied to the display of contents, such as TV or the like, other than the contents described in the above embodiments including the navigation and the DVD.

What is claimed is:

1. A display apparatus for displaying a composite image of a first content and a second content on a display screen such that an image of the first content and the second content are simultaneously viewable in a full-screen mode on an entire viewing screen when viewed from a corresponding different viewing positions relative to a direction normal to the display screen, the apparatus comprising:
   a touch panel operatively coupled with the viewing screen;
   the viewing screen and touch panel together configured to provide an operation screen, with the first and second contents being displayed as the image of the content;
   a display controller configured to receive a detection signal that indicates either an operation of the first content or an operation of the second content, based on coordinate data of a touch input on the operation screen, wherein the display controller switches the display screen from the, full-screen mode to a local display in a split-screen mode when an operation is detected, such that when in the split-screen mode, the first content is shown on a first portion of the split-screen, and the second content is shown on a second portion of the split-screen;
   the first portion of the split-screen having a touch area located away horn the second portion of the split-screen, the touch area defining a noninterference area configured to receive a touch input such that the touch input cannot interfere with the second portion of the split screen;
   the second portion of the split-screen having a touch area located away from the first portion of the spilt-screen, the touch area defining a noninterference area configured to receive a touch input such that the touch input cannot interfere with the first portion of the split screen; and
   wherein control of the local display based on coordinate data of the touch input and the noninterference areas are configured not to obstruct the display of the image of the first and second content, respectively, corresponding to another viewing position.

2. The display apparatus according to claim 1 wherein said display controller finishes the control for the local display of the first or second content when the operation of the operation screen is completed.

3. The display apparatus according to claim 2, wherein the display controller controls the display of the image such that the image of a driver-side content is displayed at an area within a predetermined range on a non-passenger side of the viewing screen viewed from a driver side, said area serving as the noninterference area on the viewing screen viewed from the driver side, and that the image of a passenger-side content is displayed at another area within a predetermined range on a non-driver side of the viewing screen viewed from a passenger side, said another area serving as the noninterference area on the viewing screen viewed from the passenger side.

4. The display apparatus according to claim 3, wherein the driver-side content is an image for a navigation apparatus, while the passenger-side content is one of a DVD-reproduced image or a TV picture.

5. The display apparatus according to claim 1, wherein said display controller finishes the control for the local display of the content when the operation of the operation screen is completed.

6. The display apparatus according to claim 5, wherein the display controller controls the display of the image such that the image of a driver-side content is displayed at an area within a predetermined range on a non-passenger side of the viewing screen viewed from a driver side, said area serving as the noninterference area on the viewing screen viewed from the driver side, and that the image of a passenger-side content is displayed at another area within a predetermined range on a non-driver side of the viewing screen viewed from a passenger side, said another area serving as the noninterference area on the viewing screen viewed from the passenger side.

7. The display apparatus according to claim 1, wherein said display controller finishes the control for the local display of the first or second content when the operation of the operation screen is completed.

8. The display apparatus according to claim 7, wherein the display controller controls the display of the image such that the image of a driver-side content is displayed at an area within a predetermined range on a non-passenger side of the viewing screen viewed from a driver side, said area serving as the noninterference area on the viewing screen viewed from the driver side, and that the image of a passenger-side content is displayed at another area within a predetermined range on a non-driver side of the viewing screen viewed from a passenger side, said another area serving as the noninterference area on the viewing screen viewed from the passenger side.

9. The display apparatus according to claim 1, wherein the display controller controls the display of the image such that the image of a driver-side content is displayed at an area within a predetermined range on a non-passenger side of the viewing screen viewed from a driver side, said area serving as the noninterference area on the viewing screen viewed from the driver side, and that the image of the passenger-side content is displayed at another area within a predetermined range on a non-driver side of the viewing screen viewed from a passenger side, said another area serving as the noninterference area on the viewing screen viewed from the passenger side.

10. A method for controlling a display apparatus that displays a composite image of a first contend and a second content on a display screen, such that an image of the first content and the second content are simultaneously viewable in a full-screen mode on an entire viewing screen when viewed from a-corresponding different viewing positions relative to a direction normal to the display screen, the method comprising:

provBuildContext a touch panel;

operatively coupling the touch panel with the viewing screen, wherein the viewing screen and the touch panel together are configured to provide an operation screen;

detecting a touch input of the display screen by an operator, that indicates either an operation of the first content or an operation of the second content based on coordinate data of the touch input, wherein the display screen is switched from the full-screen mode to a local display in a split-screen mode when the touch input is detected, such that when in the split-screen mode, the first content is shown on a first portion of the split-screen, and the second content is shown on a second portion of the split-screen:

the first portion of the split-screen having a touch area located away from the second portion of the split-screen, the touch area defining a noninterference area configured to receive the touch input such that the touch input cannot interfere with the second portion of the split screen;

the second portion of the split-screen having a touch area located away from the first portion of the split-screen, the touch area defining a noninterference area configured to receive the touch input such that the touch input cannot interfere with the first portion of the split screen; and the noninterference areas are configured not to obstruct the display of the image of the first and second content, respectively, corresponding to another viewing position.

11. The method according to claim 10 further comprising the step of finishing the control for the local display of the first or second content when the operation of the operation screen is completed.

12. The method according to claim 10 further comprising the steps of displaying an image of a driver-side content at an area within a predetermined range on a non-passenger side of the viewing screen viewed from a driver side, said area serving as the noninterference area on the viewing screen viewed from the driver side, and displaying an image of a passenger-side content at another area within a predetermined range on a non-driver side of the viewing screen viewed from a passenger side, said another area serving as the noninterference area on the viewing screen viewed from the passenger side.

13. The method according to claim 12, further comprising the step of determining that operation of the operation screen is completed when a next operation of the screen is not performed within a predetermined time interval after a previous operation of the operation screen.

* * * * *